United States Patent
Borza

(10) Patent No.: US 10,228,965 B2
(45) Date of Patent: Mar. 12, 2019

(54) ARCHITECTURE, SYSTEM AND METHOD FOR CREATING AND EMPLOYING TRUSTED VIRTUAL APPLIANCES

(71) Applicant: Synopsys, Inc., Mountain View, CA (US)

(72) Inventor: Michael Borza, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/595,425

(22) Filed: May 15, 2017

(65) Prior Publication Data
US 2018/0329736 A1 Nov. 15, 2018

(51) Int. Cl.
*G06F 9/455* (2018.01)
*G06F 21/33* (2013.01)
*H04L 12/28* (2006.01)

(52) U.S. Cl.
CPC .......... *G06F 9/45558* (2013.01); *G06F 21/33* (2013.01); *H04L 12/2814* (2013.01); *H04L 12/2818* (2013.01)

(58) Field of Classification Search
None
See application file for complete search history.

(56) References Cited

U.S. PATENT DOCUMENTS

| | | | |
|---|---|---|---|
| 8,856,889 B2 | 10/2014 | Alwar | |
| 9,749,331 B1* | 8/2017 | Koeten | H04L 63/102 |
| 2006/0023883 A1* | 2/2006 | Konetski | G06F 21/85 380/255 |
| 2014/0201846 A1* | 7/2014 | Anantharam | H04L 63/0428 726/26 |
| 2015/0134965 A1* | 5/2015 | Morenius | G06F 21/57 713/172 |

* cited by examiner

*Primary Examiner* — Gregory A Kessler
(74) *Attorney, Agent, or Firm* — Jaquez Land Greenhaus LLP; Bruce W. Greenhaus, Esq.

(57) ABSTRACT

A system and method to automatically provision a trusted virtual appliance (VA) (which may include one or more virtual machines (VM)) for installation onto a consumer-owned acceptable device (COAD) where the system and method may create a provision the VA for the COAD without human interaction and a COAD may install a received trusted VA without human interaction, and the VM of a VA may operate independently of other applications on the COAD other than a VM supervisory program such as a hypervisor.

20 Claims, 8 Drawing Sheets

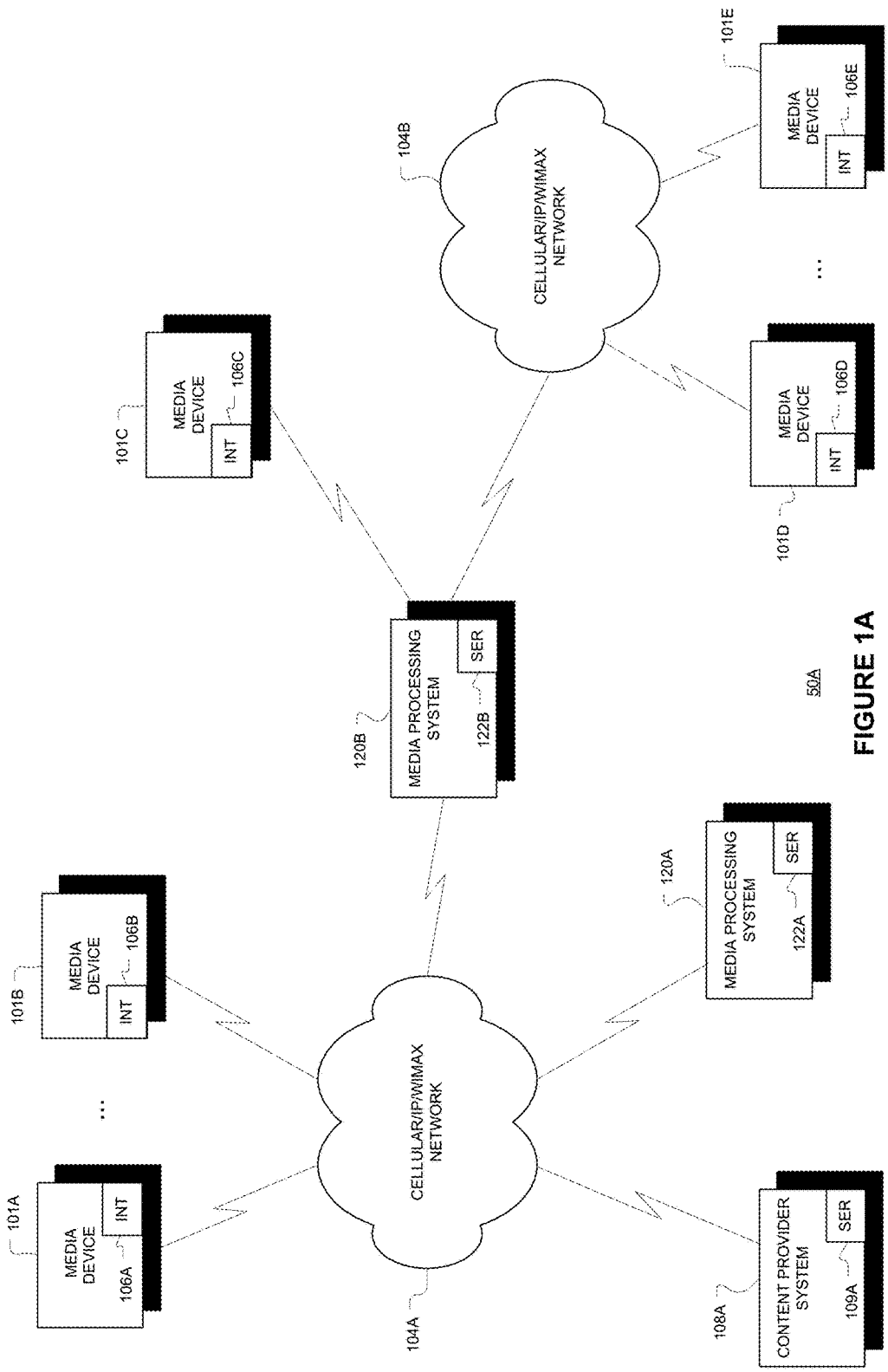

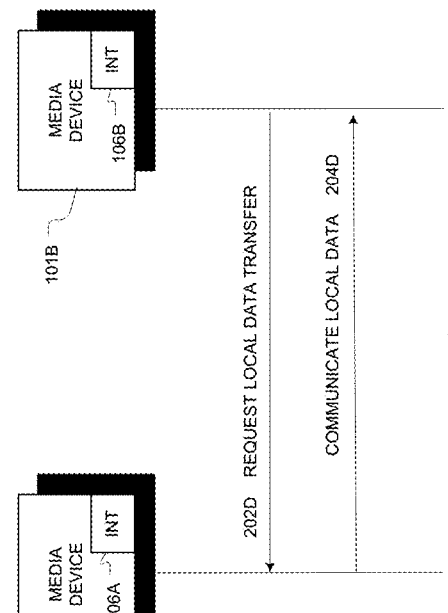
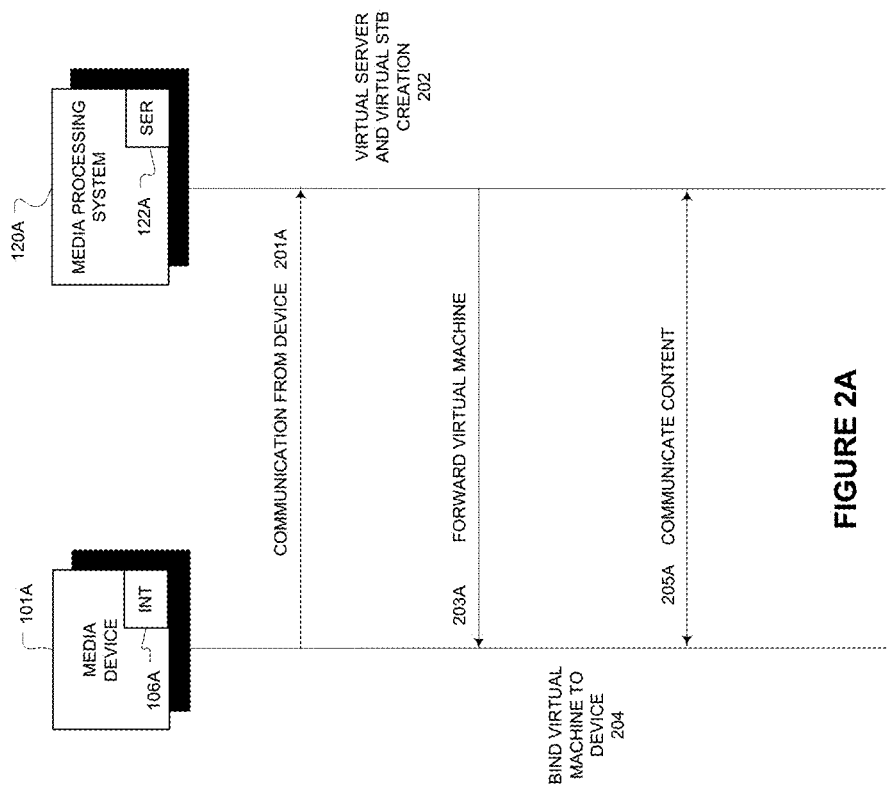

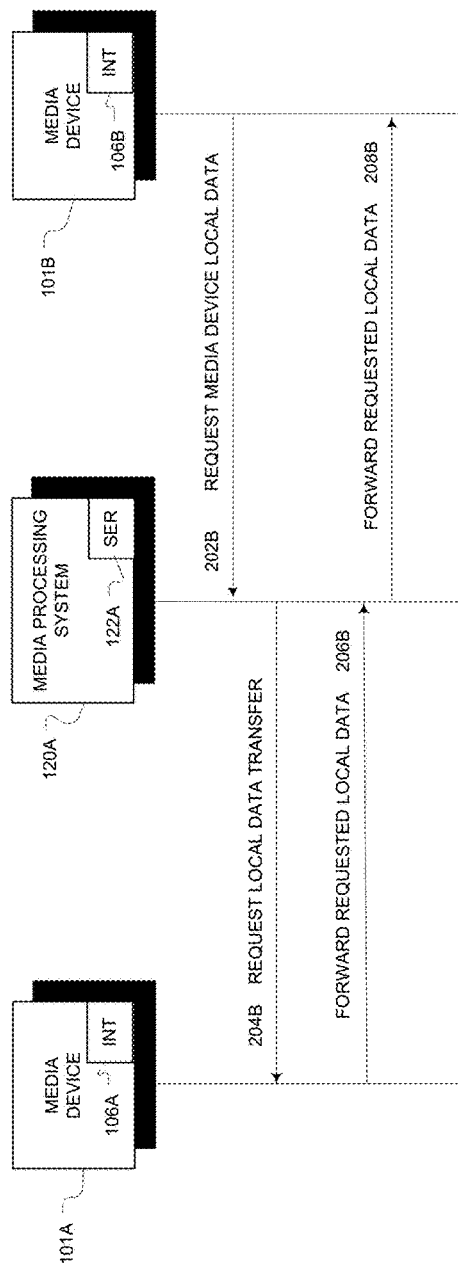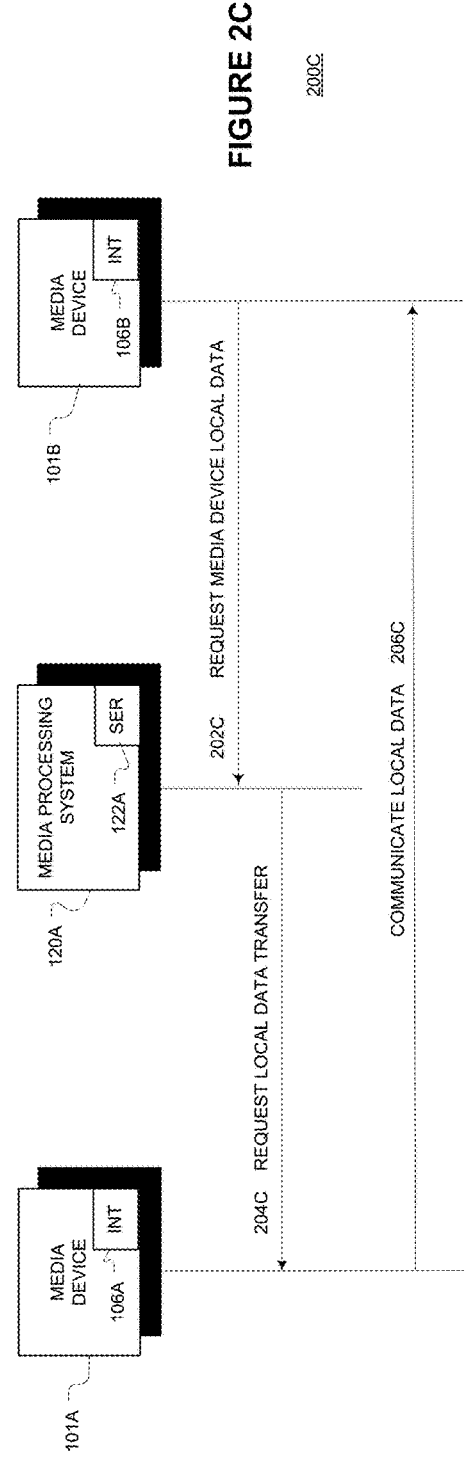

ARCHITECTURE, SYSTEM AND METHOD FOR CREATING AND EMPLOYING TRUSTED VIRTUAL APPLIANCES

TECHNICAL FIELD

Various embodiments described herein relate generally to systems and methods of securely providing protected content over a network to content receiving devices.

BACKGROUND INFORMATION

It may be desirable to enable users to receive secure content over a network on their device including user content stored on another user device.

SUMMARY

In accordance with one embodiment, a system and method may be provided to automatically provision a trusted virtual machine (VM) for installation onto a consumer-owned acceptable device (COAD). The system and method may create and provision the VM for the COAD without human interaction. A COAD may install a received trusted VM without human interaction. The VM may be configured to run limited applications and termed a Virtual Appliance (VA). The VM or VA may operate independently of other applications on the COAD other than a VM or VA supervisory program such as a hypervisor.

A hypervisor may assign virtual or physical program memory exclusively for use by the VM or VA where the VM and VA may execute one or more applications in its own independent operating system and exclusively use the memory. The hypervisor may also assign program and data storage such as disk space for exclusive use by the VM and VA operating system and one or more applications. Accordingly, the VM or VA may be isolated from all other applications on the COAD given they are executed by other operating systems and do not have access to the VM program and data memory/storage. Such a VM may be able to securely communicate content required or desired to be protected to a certain standard by a content provider. The content provider may include multimedia content such as video, photo, or music content in a digital format. A consumer may be a business or residential user desiring to communicate secure content on their premises equipment not provided by the secure content provider.

Accordingly, the provisioning by a secure content provider and installation of a VM or VA on a COAD may enable a COAD user to securely communicate content over a network. A secure content provider system may include one or more secure servers. The secure servers may store one or more virtual machines or appliances (hereinafter VM) clones where a VM clone may be uniquely encoded for a COAD, COAD user(s) or a combination of both to create a trusted VM specific for a COAD and/or user(s). A secure content provider system may provision or encode VM clones for a COAD or user prior to a COAD connecting to a secure content provider to request secure data or link/register with the provider.

Once a COAD connects to a secure content provider via a network, the provisioned trusted VM associated with the COAD or user may be downloaded to a COAD for execution/installation on the COAD. The secure content provider may download the trusted VM to the COAD via a secure channel of a network. A trusted VM may include secured credentials related to the target COAD and user(s).

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

FIG. 1A is a block diagram of secure multimedia communication (SMC) architecture according to various embodiments.

FIG. 2A is a diagram of service request communication between a media device and a media processing system in SMC architecture according to various embodiments.

FIG. 2B is a diagram of local user data request communication between a first media device, a second media device, and a media processing system in SMC architecture according to various embodiments.

FIG. 2C is a diagram of local user data request communication between a first media device, a second media device, and a media processing system in SMC architecture according to various embodiments.

FIG. 2D is a diagram of local user data request communication between a first media device and a second media device in SMC architecture according to various embodiments.

DETAILED DESCRIPTION

FIG. 1A is a block diagram of secure multimedia communication (SMC) architecture 50A according to various embodiments. As shown in FIG. 1A, architecture 50A includes a first and a second media processing system (MPS) 120A, 120B, a multimedia content provider system 108A, several networked digital media devices (MD) 101A-E which may be COAD, and wired or wireless networks 104A, 104B. In an embodiment, a media processing system (MPS) 120A may be a secure multi-media processing system (SMPS) that may securely communicate multimedia files to digital media devices (MD) 101A-E via a wired or wireless connection. A SMPS 120A, 120B may securely communicate multimedia content with a content provider system 108A server 109A. In an embodiment, a SMPS 120A, 120B may communicate with a content provider system 108A via a wired or wireless network 104A, 104B, 104C.

In architecture 50A, a content provider system 108A may want or require a SMPS 120A, 120B to communicate their content using secure channels and to secure devices 101A-E, the security conforming to a certain minimum level. In an embodiment, the security level may include minimum digital right management (DRM) levels, data encryption/decryption levels (number of bits in one embodiment), and content protection requirements for devices 101A-E. A SMPS 120A, 120B may also be required to ensure that a device 101A-E user (136, FIG. 3A) is authorized to receive communicated content and the devices 101A-E adequately protect or secure any communicated content.

In order to ensure a media device 101A-E both protects communicated content and only is viewed by authorized users, architecture 50A may only employ or include media devices 101A-E that are provided by certain providers. In architecture 50A, a content provider 108A may require a SMPS 120A-B to provide MD 101A-E to users 136. For example, for protected video delivery systems, the service provider such as cable or satellite television providers may supply receivers (MD) to end-users 136 in order for authorized end-user 136 to receive content. Some service providers may also enable users to view limited media content on user owned or controlled Internet Protocol (IP) configured devices (cellphones, tablets, laptops, desktops) having certain operating systems via service provider applications.

The service providers' applications may support only limited operating systems such as Microsoft, Apple, Android, and Linux operating systems. The service provider applications run on the users' devices operating system. The service providers (108A or 120A, 120B) applications may limit a user's devices output capabilities. The application may limit video display to the user's device's integrated display. In addition, other applications on such a device may be able to access the service provider application content, making the content less secure.

Figure 3A:
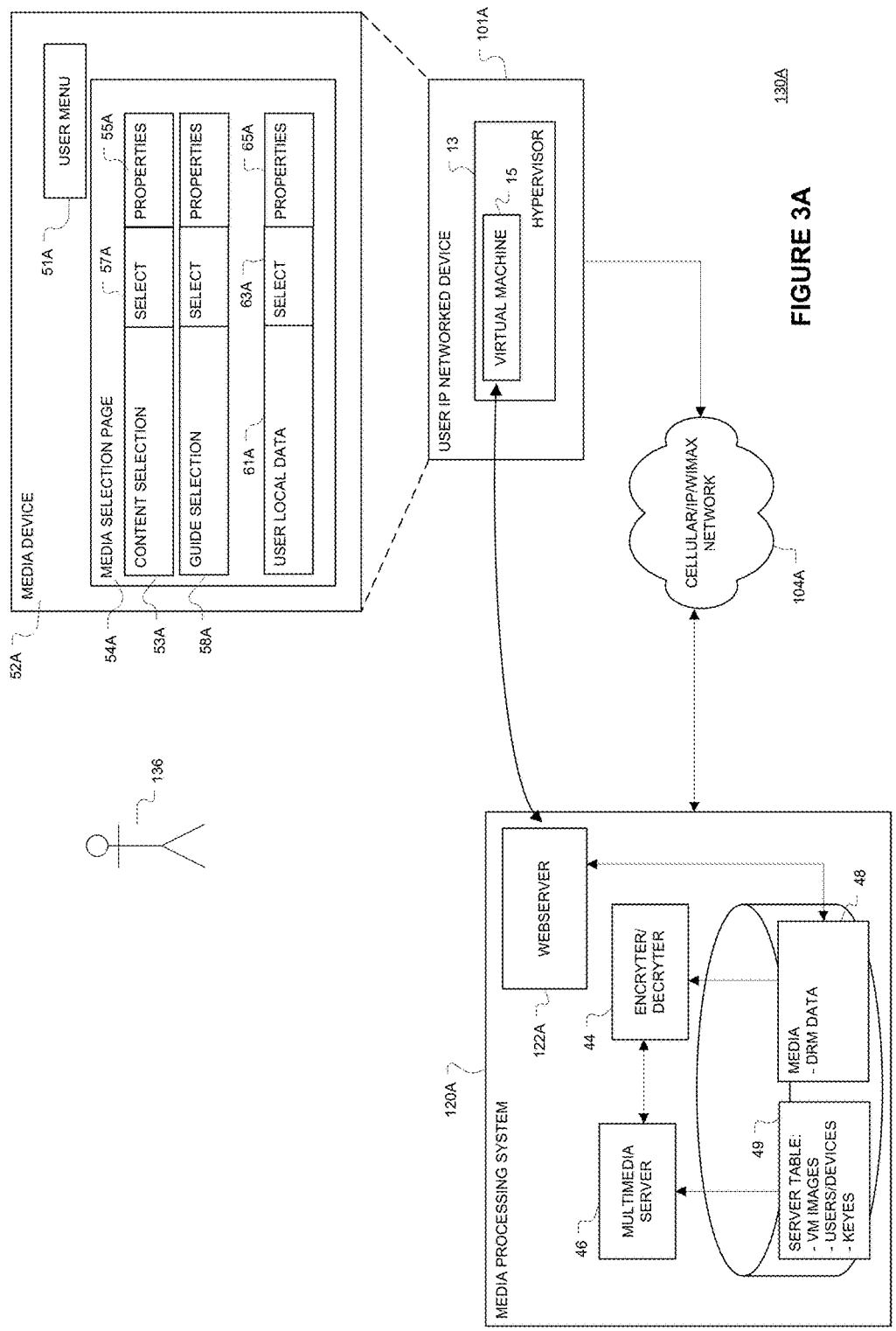
FIG. 3A is a block diagram of media processing system architecture providing a user content selection page according to various embodiments.
Figure 3B:
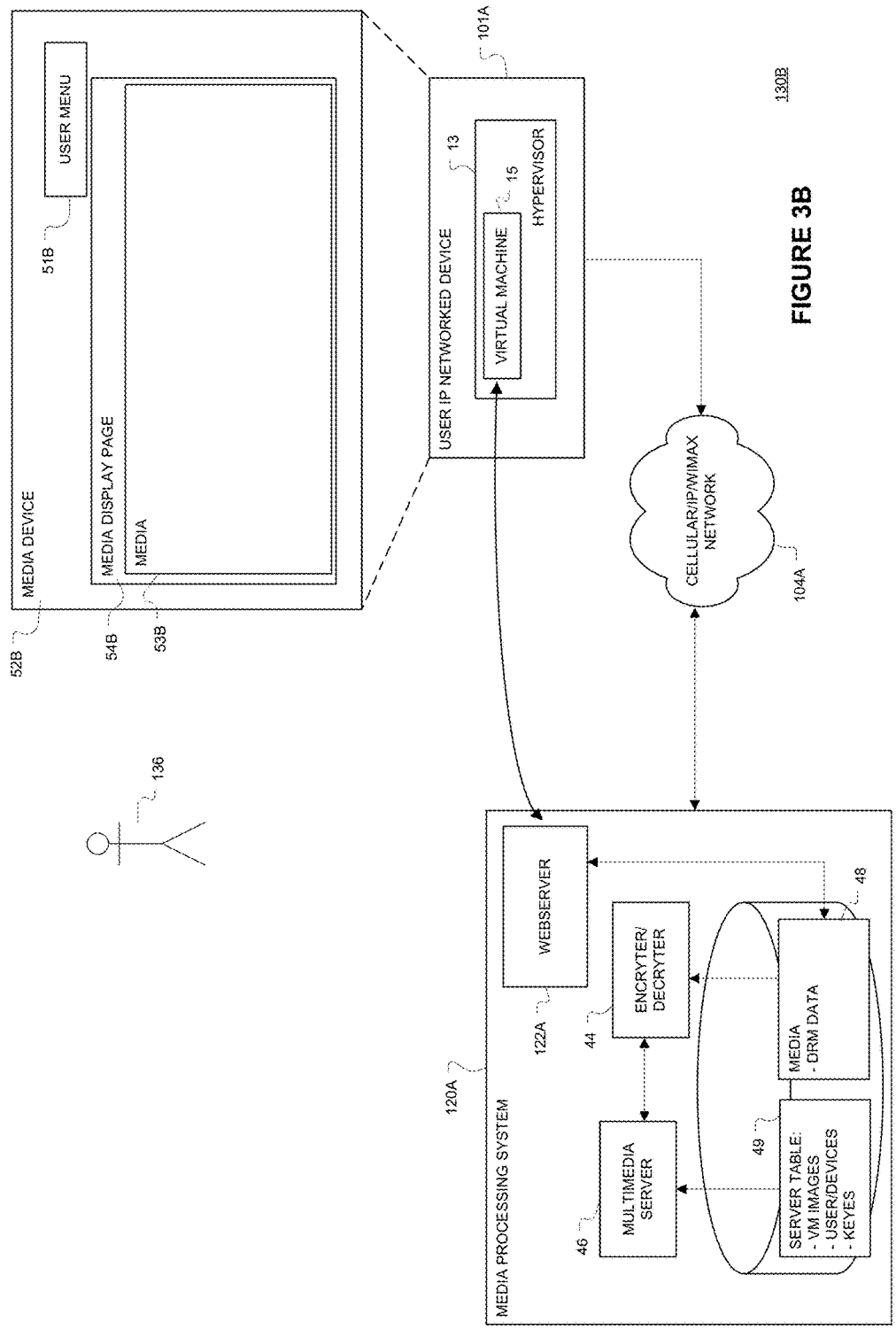
FIG. 3B is a block diagram of media processing system architecture providing a media display page according to various embodiments.

A media device 101A-E, according to an embodiment of the present invention, may be any media device that may install and execute a SMPS 120A-B provided virtual machine (VM) 15 (FIG. 3A, 3B). As known to one of skill in the art, a virtual machine (VM) operates on a hypervisor. A hypervisor may communicate directly with a MD 101A-E hardware (type-I) or execute on its operating system (type-II). In either hypervisor version (type I and II), a VM 15 is not accessible by any other VM operated by the hypervisor or another application executing in the MD operating system. As noted, a VM 15 has its own operating system that functions on the virtual or actual memory and storage uniquely allocated for the VM by the hypervisor.

A MD 101A-E executing a VM (15, FIG. 3A, 3B) provided by a SMPS 120A-B, may securely communicate data between the MD 101A-E and a SMPS 120A-B and another MD 101A-E in an embodiment. A SMPS 120A-B may also ensure that a User 136 is authorized to communicate content by encoding user information in the VM 15 including DRM or other security keys. When secure content is delivered to a MD 101A-E, it may include User keys and device keys MD 101A-E where reciprocal keys are encoded in the VM 15 provided to a MD 101A-E.

When a user or device (MD 101A-E) is no longer authorized to receive content, the appropriate keys may not be included in content on a channel received by a MD 101A-E. A VM 15 in a MD 101A-E may not be able to decode content when the appropriate User/device key or DRM information is not provided/included with communicated content. As noted, a VM 15 provided to a MD 101A-E may include DRM or decryption keys that are uniquely associated with the MD 101A-E and/or User 136. When a MD 101A-E or User 136 is de-authorized at some point, a SMPS 120A-B may change the DRM or encryption keys for communicated content, preventing the 101A-E VM from decoding the secured content.

Because the VM 15 of a MD 101A-E is separate from other applications and the MD basic operating system, a User may not be able to view or modify its DRM, decryption, or encryption keys. When a MD 101A-E or User 136 becomes authorized after a de-authorized time interval, a SMPS 120A-B may communicate secure content using the DRM or keys associated with the original VM 15. In an embodiment, a SMPS 120A-B may provision a new VM 15 for installation in a MD 101A-E after a de-authorization period. In an embodiment, architecture 50A may employ VMs 15 conforming to the Open Virtualization Format (OVF) published by the Distributed Management Task Force. or the User.

In an embodiment, architecture 50A may enable a MD 101A-E to securely communicate content with another MD 101A-E. In architecture 50A, a User 136 may own or operate multiple MD 101A-E where a first MD 101A may located at a first physical location and a second MD 101B may located at a second physical location. The first and second locations may be in the same building, on the same network, in different building, and on different networks.

In an embodiment, a VM 15 provided to a MD 101A-E by SMPS 120A, 120B for installation thereon may include code or applications (in its private operating system) that enable a User 136 to communication locally stored content with another MD 101A-E. In an embodiment, the other MD 101A-E may also include a VM 15 provided by a SMPS 120A, 120B including similar code or applications that enable communication of locally stored content with the other 101A-E of architecture 50A. The VM 15 of a MD 101A-E may enable inter-MD 101A-E (206C, FIG. 2C and 204D, FIG. 2D) communication that conforms to the Digital Transmission Content Protection (DTCP) as licensed by the Digital Transmission Licensing Administrator (www.dtcp.com). A VM 15 of a MD 101A-E may employ other transmission protocols that enable secure inter-MD communication of data.

In an embodiment, a SMPS 120A-B may provide VMs 15 and other secure data including multimedia content to a MD 101A-E. A SMPS 120A-B may receive multimedia content from a content provider system 108A continuously or in response to a request from a SMPS 120A-B. As shown in FIG. 1A, a SMPS 120A, 120B may include a multimedia server 122A, 122B that may enable communication between a SMPS 120A, 120B, a content provider system 108A, and a plurality of IP networked digital media devices (MD) 101A-E. A SMPS 120A, 120B may employ an application specific integrated circuit (ASIC) (274 FIG. 6B) to transceive signals with one or more MD 101A-E and a content provider system 108A. A content provider system 108A may also employ an application specific integrated circuit (ASIC) (274 FIG. 6B) to transceive signals with a SMPS 120A, 120B.

A SMPS 120A, 120B server 122A, 122B may be a media server that communicates multimedia data that may be processed by a VM 15 resident or installed on a MD 101A-E. As noted, a SMPS 120A, 120B server 122A, 122B may also communicate VMs 15 that may be installed onto a MD 101A-E. In an embodiment, a SMPS 120A, 120B server 122A, 122B may encode multimedia data using various multimedia formats and may further encrypt the data using key(s) included in a VM 15. A SMPS 120A, 120B server 122A, 122B may use a secure IP connection to communicate VMs 15 and multimedia content to a MD 101A-E in an embodiment.

In an embodiment, a SMPS 120A, 120B server 122A, 122B may communicate data including media using other protocols including application specific protocols such as protocols required by multimedia content providers, e.g. the Motion Picture Association of America (MPAA). A VM 15 installed on a MD 101A-E may include a program to decode/encode and encrypt/decrypt application specific protocol communications between the MD 101A-E, a SMPS 120A, 120B, and another MD 101A-E. As shown in FIG. 1A, a MD 101A, 101B may be coupled to a SMPS 120A, 120B via a network 104A. The network 104A may be a local network or a network of networks. A MD 101C may be coupled directly to a SMPS 120B via a wired or wireless connection. In another embodiment, a MD 101D, 101E may communicate with a SMPS 120B via a network 104B.

The network 104A may be a local network or a network of networks. A MD 101A-E may include an interface (INT) (network interface controller in an embodiment) 106A-106E that enables secure and unsecured IP based communication with a SMPS 120A, 120B and other MD 101A-E. A MD 101A-E interface 106A-106E may include a modem/transceiver (244, FIG. 6A). The modem/transceiver 244 may include an application specific integrated circuit (ASIC). A network 104A, 104B may be a local network, a network of networks, or a worldwide network of networks, termed the "Internet", cellular network, or WiMax network. In an embodiment, a MD 101A-E may communicate with a SMPS 120A, 120B or other MD 101A-E via several networks. It is noted that in an embodiment, the networks 104A, 104B may be industrial, scientific and medical (ISM) radio bands, Groupe Spécial Mobile (GSM), Code-division multiple access (CDMA), time division multiple access (TDMA), mesh, and short messaging system (SMS) based network, WiMax, IP (wired or wireless network) such as 802.11a, b, g, n networks.

A network 104A, 104B may be a terrestrially based network, a satellite based network, or combination thereof. Each MD 101A to 101E may include an interface 106A to 106E that enables communication between a MD 101A-E and a SMPS 120A, 120B via a network 104A, 104B directly or indirectly. In an embodiment, a MD 101A-E may be cellular device such an iPhone® or other smartphone, tablet device including an iPad®, laptop, tablet, desktop, or other electronic device capable of communicating via one or more wired or wireless protocols and capable of installing a VM 15.

Such a device may install a hypervisor application so it can install a VM 15. In an embodiment, a SMPS 120A, 120B may be an electronic device 260 that may include a module 274 to communicate signals with a MD 101A-E, another SMPS 120A, 120B, and content provider system 108A. A content provider system 108A may be an also be an electronic device 260 that may include a module 274 to communicate signals with a MD 101A-E, a SMPS 120A, 120B, and another content provider system (CPS) 108A. A SMPS 120A, 120B may also include a server 122A, 122B (292, FIG. 6B). A CPS 108A may include a server 109A (292, FIG. 6B) in an embodiment.

In an embodiment, a media device 101A-E may request digital media content (53B, FIG. 3B) from a SMPS 120A-120B server 122A-122BA or CPS 108A or attempt to link with a SMPS 120A-B, CPS 108A, or another MD 101A-E (communication 201A in FIG. 2A). The digital media content may include video, audio, pictures, text, or any combination thereof. A SMPS 120A associated with the MD 101A-E or the network 104A, 104B coupled to the MD 101A-E may receive the communication from MD 101A-E.

Figure 5:
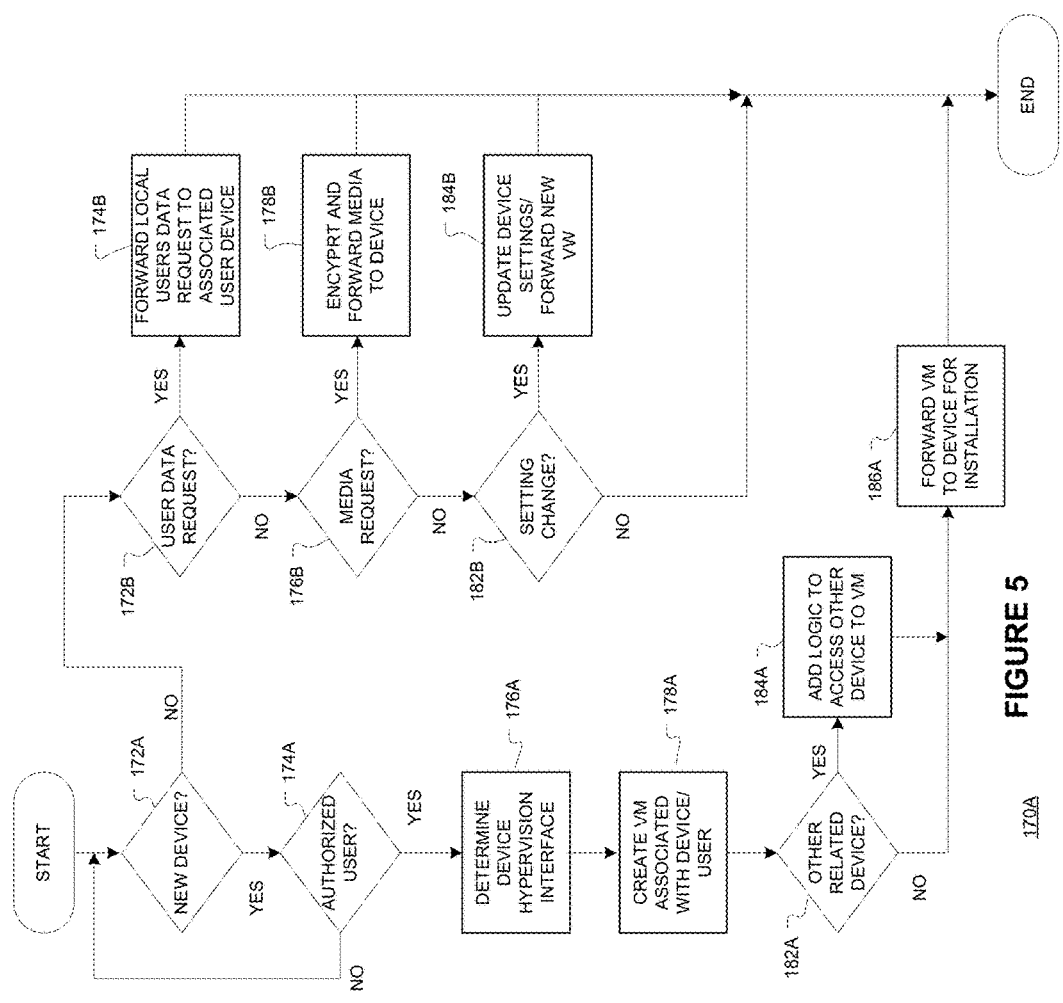
FIG. 5 is a flow diagram illustrating several methods according to various embodiments.

The communication 201A may be a content request or an initial linkage attempt to a SMPS 120A, 120B, a CPS 108A, or another MD 101A-E (locally stored MD content). A SMPS 120A, 120B may employ the algorithm 170A shown in FIG. 5 to process a communication 201A from a MD 101A-E. When the communication 201A is from a MD 101A-E not registered with the SMPS 120A-B or from a VM 15 not including required keys or encryption (activity 172A), the SMPS 120A-B may verify whether the MD 101A-E or its User 136 is authorized to communicate with the SMPS 120A, 120B or another MD 101A-E (activity 174A).

Figure 4:
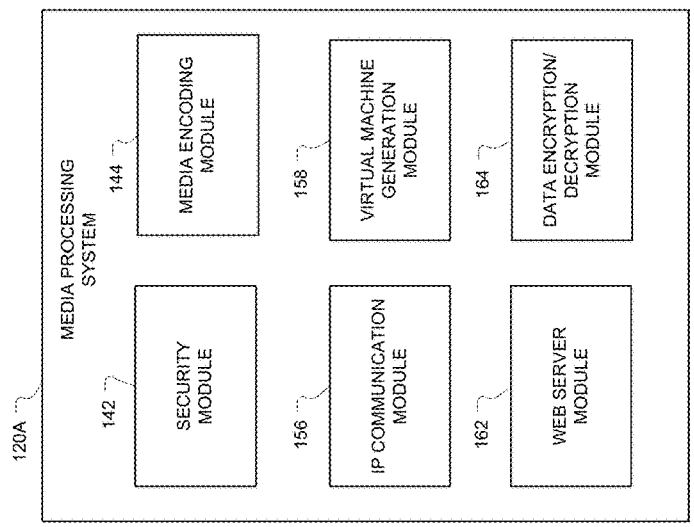
FIG. 4 is a block diagram of a media processing system according to various embodiments.

In an embodiment, the communication request 201A from a MD 101A-E may include encoded information. The encoded information may securely identify the MD 101A-E and its authorized User(s) 136. The encoded information may also indicate the MD 101A-E type, version, and hypervisor 13 (FIGS. 3A and 3B) and VM 15 active or installed on the MD 101A-E. As shown in FIG. 4, a SMPS 120A may include a security module 142, a media encoding module 144, an IP communication module 156, a virtual machine (VM) generation module 158 for provisioning one of the plurality of virtual machines for a consumer owned system, a web server module 162, and a data encryption/decryption module 164.

As shown in FIGS. 3A and 3B, a SMPS 120A may also include several databases or tables 48 and 49. The database 48 may be a media database and include secured multimedia content including DRM protected data. The database or table 49 may be a server table and include preconfigured and forwarded virtual machine (VM) images, authorized Users 136 and Devices (MD 101A-E) table, and security keys to be employed in VMs 15 and to securely communicate content and VMs with MDs 101A-E, other SMPS 120A, B, and CPS 108A.

In an embodiment, a SMPS 102A security module 142 may determine whether a MD 101A-E and User 136 are authorized to use the SMPS 120A via the User/device table of server table 49. When the MD 101A-E and User 136 are authorized to communicate with the SMPS 120A-B but the MD 101A-E does not have a current VM 15, the SMPS 120A-B may determine which hypervisor 13 is installed/ active on the requesting MD 101A-E (activity 176A). A SMPS 120A-B may then create or associate an already created VM 15 with the MD 101A-E (activity 178A).

As noted, media service providers such as cable, IPTV and satellite TV service providers may provide set top boxes (STBs) or other devices as a means to deliver services to consumers or Users 136 to meet their obligations to protect content owned by content producers and distributors (CPS 108A). These service provider supplied devices typically create hardware-based roots of trust between them and a SMPS 120A, 120B and a high protection level for embedded secret data or keys that may be employed to protect programming or delivered content. While these devices and the means to protect them are well-known to those skilled in the art, they may be difficult to manage, provision, distribute and inventory. Architecture 50A is configured to enable service providers (CPS 108A), carriers and distributors (SMPS 120A, 120B) to protect the content they deliver a MD 101A-E without trust in the consumer's hardware.

It is noted that architecture 50A could be employed to deliver any type of secure content and is not limited to multimedia content. Multimedia content delivery is presented as an example of the potential use of architecture 50A. In an embodiment, a MD 101A-E may be generically an enabled consumer device, such as Smart TV or User's STB, which is a host for functions defined in executable software. The VM 15 (or VA in embodiment) may installed and executed (or hosted by a hypervisor) on an enabled consumer device (MD 101A-E or COAD).

As noted a VM 15 in the server table 49 of a SMPS 120A, 120B may be provisioned with secured credentials related to either the intended MD 101A-E and User 136 to create a trusted VM 15 (activity 178A). In an embodiment, a MD 101A-E or User 136 may be associated with another MD 101A-E. The security module 142 may determine whether a MD 101A-E or User 136 may be associated with another MD 101A-E (activity 182A). When a MD 101A-E or User 136 is associated with another MD 101A-E, a VM 15 including logic that enables secure communication of data between a MD 101A-E may be forwarded to a MD 101A-E for installation or the required logic may be added to the VM 15 prior to forwarding a MD 101A-E for installation (activity 184A, 186A) (communication 203A of FIG. 2A).

The data to be communicated between a first and second MD 101A-E in architecture 50A may be locally stored data in a MD 101A-E and may be User created data or SMPS 120A, 120B provided secure content. In one embodiment, any data communicated between a first MD 101A-E to another MD 101A-E via a MD's VM 15 may pass through a SMPS 120A such as shown in the communications 200B of FIG. 2B. As shown in FIG. 2B, when a first MD 101B requests the communication of data located on another MD 101A, the MD 101B VM 15 forwards the request to an associated SMPS 120A (communication 202B) (activity 172B of FIG. 5). The associated SMPS 120A may forward the data request to the respective MD 101A (communication 204B) (activity 174B of FIG. 5). The MD 101A VM 15 may process the local data request and forward requested data to the MD 101B via the SMPS 120A (communications 206B, 208B).

In another embodiment, any requests for data communication between a first MD 101A-E to another MD 101A-E via the MD's VM 15 may be setup by a SMPS 120A but the data passed directly thereafter as shown in the communications 200C of FIG. 2C. As shown in FIG. 2C, when a first MD 101B requests the communication of data located on another MD 101A, the MD 101B VM 15 may forward the request to an associated SMPS 120A (communication 202C). The associated SMPS 120A may forward the data request to the respective MD 101A (communication 204C). The MD 101A VM 15 may process the local data request and forward requested data directly to the MD 101B (communication 206C).

In another embodiment, any requests for data communication between a first MD 101A-E to another MD 101A-E via the MD's VM 15 may processed by the respective MDs 101A-E as shown in the communications 200D of FIG. 2D. As shown in FIG. 2D, when a first MD 101B may requests the communication of data located on another MD 101A and the MD 101B may forward the request directly to the MD 101A (communication 202D). The MD 101A VM 15 may process the local data request and forward requested data directly to the MD 101B (communication 204D).

In an embodiment, a VM 15 installed on a MD 101A-E may provide a media selection and control page 52B as shown in FIG. 3A and display selected media 53B in a media display page 54B as shown in FIG. 3B. As shown in FIGS. 3A and 3B, architecture 130A, 130B include a SMPS 120A coupled to a User 136 MD 101A via a network 104A. The SMPS 120A includes a server 122A, a multimedia server 46, an encryption/decryption module 44, and databases 48, 49. The User's MD 101A may include a hypervisor 13 operating an a hardware or software level in the MD 101A. The trusted VM 15 provided by the SMPS 120A may be hosted by the hypervisor 13 of the MD 101A.

In an embodiment, the VM 15 may provide a media selection page 54A to enable a User 136 to select media to be viewed and/or heard and control various operations of the VM 15. As shown in FIG. 3A, the media selection page 54A may include a user menu 51A, content selection row 53A with selection tab 57A and properties tab 55A, a content guide row 58A with selection tab and properties tab, and a User local content row 61A with selection tab 63A and properties tab 65A.

The content selection row 53A may display multimedia content a User 136 may select to view. The properties may include different formats or versions. The guide selection row 58A may display a listing of multimedia content currently available or scheduled for display in the future. The user local data row 61A may enable a User to display or view local data stored on the MD 101A-E or another 101A-E associated with the User 136.

When a User 136 selects content for display (activity 176B of FIG. 5), a VM 15 may forward the request to an associated SMPS 120A for provision (activity 176B). The SMPS 120A may verify the media request is valid. The SMPS 120A may request the media from the CPS 108A when not buffered or currently being streamed from the CPS 108A to the SMPS 120A. A SMPS 120A may then encode the media via the media encoding module 144 based on the VM 15 or MD 101A-E requirements. The SMPS 120A may then encrypt the encoded data via the data encryption/decryption module 164 prior to forwarding the encoded, encrypted data to the MD 101A-E (activity 178D) (communication 205A of FIG. 2A).

As shown in FIG. 3A, a User 136 may also be able to configure the operation of the MD 101A-E VM 15 (window 51A). As a function of the requested change (such as adding subscriptions to various media content), a SMPS 120A-B may forward an updated or new VM 15 (activity 182B, 184B of FIG. 5). The new or updated VM 15 may enable a User to view new or different content 53A. As shown in FIG. 3B, a VM 15 via media display page 54B may display or play the requested media in window 53B. As noted, the media may be forwarded from a SMPS 120A-B or another MD 101A-E in an embodiment.

Figure 1B:
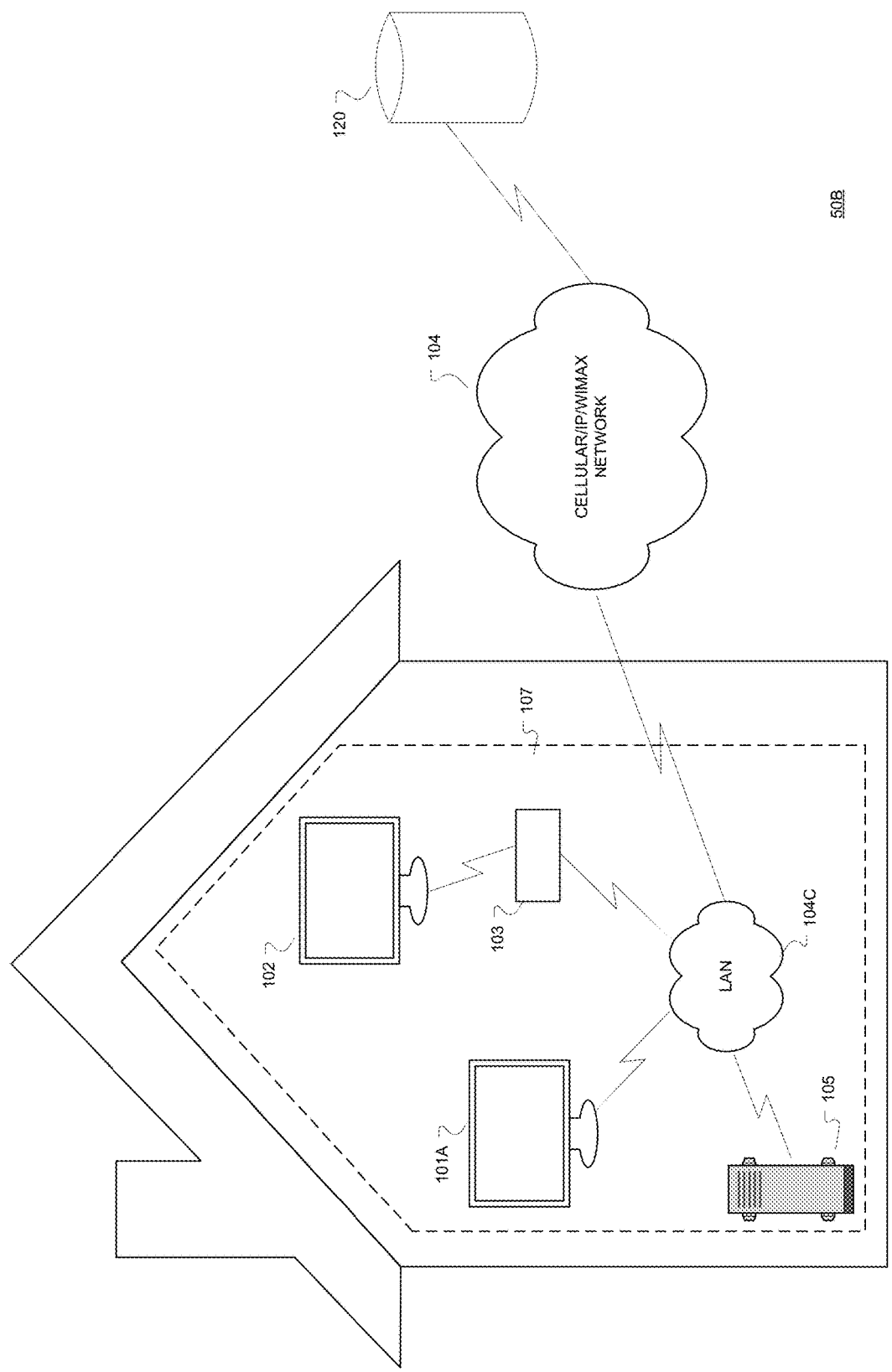
FIG. 1B is a block diagram of secure multimedia communication (SMC) architecture including consumer multimedia architecture according to various embodiments.

FIG. 1B is a block diagram of secure multimedia communication (SMC) architecture 50B including consumer multimedia architecture 107 according to various embodiments. As shown in FIG. 1B, architecture 50B includes a SMPS 120, network 104, and User architecture 107. The User architecture 107 is coupled to the SMPS 120 via the network 104. The User architecture 107 may include a personal computer 105, a smart TV 101A, a STB 103, a second smart TV 102 and a local area network (LAN) 104C. The LAN 104C may enable the personal computer 105, the smart TV 101A, the STB 103, and the second smart TV 102 to communicate with the SMPS 120 via the network 104 and a gateway (not shown). In an embodiment, the personal computer 105, the smart TV 101A, the STB 103, and the second smart TV 102 may be MD 101A-E or COAD and may include a hypervisor 13 that may be able to host a VM 15. In an embodiment, the personal computer 105 may function as personal multimedia server.

In an embodiment, the SMPS 120 may be a service provider (generically used herein to include service provider, cable operator, wireless service provider etc.) that operates a secure data center comprising one or more secure servers managed by one of the secure content system or a secure content provider storing a plurality of VMs 15, each VM 15 including unique identity information and logic to enable secure communication within the secure content system. When a User attempts to obtain service from a VM capable device 101A, 102, 103, 105, a SMPS may automatically provision an appropriate VM or VA to be installed on the device 101A, 102, 103, 105 with or without intervention from a service provider employee. In an embodiment, another group may forward or include an appropriate VM on a device 101A, 102, 103, 105. For example, an equipment manufacturer may include one or more VMs for different service providers in a device 101A, 102, 103, 105 during factory configuration or prior to delivery to a consumer, wholesaler, or retailer.

As noted, a SMPS 120A may include VMs in a table 49 for provisioning to a MD 101A-E. The one or more un-provisioned VM may be clones in its server, where each clone is ultimately to be uniquely provisioned for an individual consumer device 101A-E or User 136. In an embodiment, each type or model of enabled consumer media device MD 101A-E may have its own specific VM clone (to mate or operate on the MD 101A-E hypervisor).

In an embodiment, VMs may be initialized or created in bulk for deployment to consumers' devices 101A-E, or may be provisioned on-demand at subscription time (initial service request to a SMPS 120A-B). VM 15 initialization may include creating a VM unique key (symmetric key or asymmetric key pair) which is used as the encryption key to generate other keys. VM 15 initialization may also include creating VM identification credentials (e.g., key pair with optional certificates) and temporary credentials to be combined with device 101A-E unique identification.

In some cases, VM initialization may include running the VM on a hypervisor in an isolated network within the SMPS 120A-B to create parameters required for its ultimate operation. For example, when a VM 15 implements the DTCP protocol it may pair the VA with a DTCP transmitter or application (activity 184A of FIG. 5) in the SMPS 120A. The addition of DTCP support may require completing a locality test based on measuring network latency and ensuring that measured latency is shorter than a specified maximum.

In an embodiment, a MD 101A-E may receive a VM from an application store, a web site, or as part of the process of subscribing to the service as described above. A trusted VM installed on a MD 101A-E may be fully activated and ready to start running without further authentication. In an embodiment, the VM 15 may require further configuration by the consumer including providing login credentials to prove that the trusted VA is being used by an authorized subscriber of service from the SMPS 120A-B or CPS 108A.

Once the VM 15 installation is complete on a MD 101A-E, MD 101A-E hardware keys may be used to bind the MD 101A-E with the VM 15 to preventing copying of the trusted VM 15 onto other MD 101A-E. In an embodiment, a User may install different VMs 15 from different service providers SMPS 120A, 120B, CPS 108A to be able to receive content from different service providers. A User 136 may select the VM 15 to be executed from a hypervisor 13 to receive content from different providers SMPS 120A, 120B, CPS 108A. The hypervisor 13 may also allow multiple VMs 15 to operate in parallel and a User 136 may select from different VMs 15 via the hypervisor 13 to receive content from different providers.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CDROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 6B:
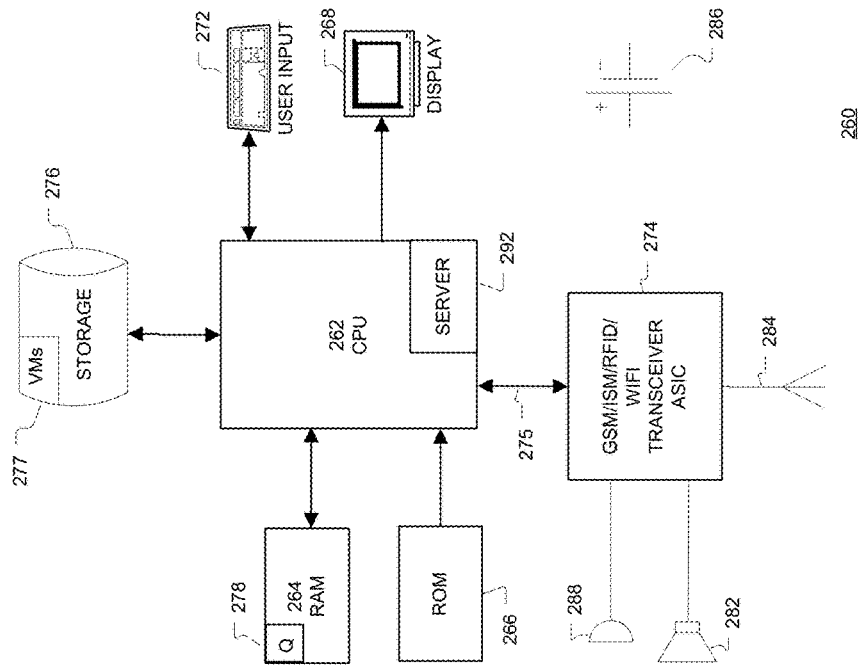
FIG. 6B is a block diagram of an article according to various embodiments.
Figure 6A:
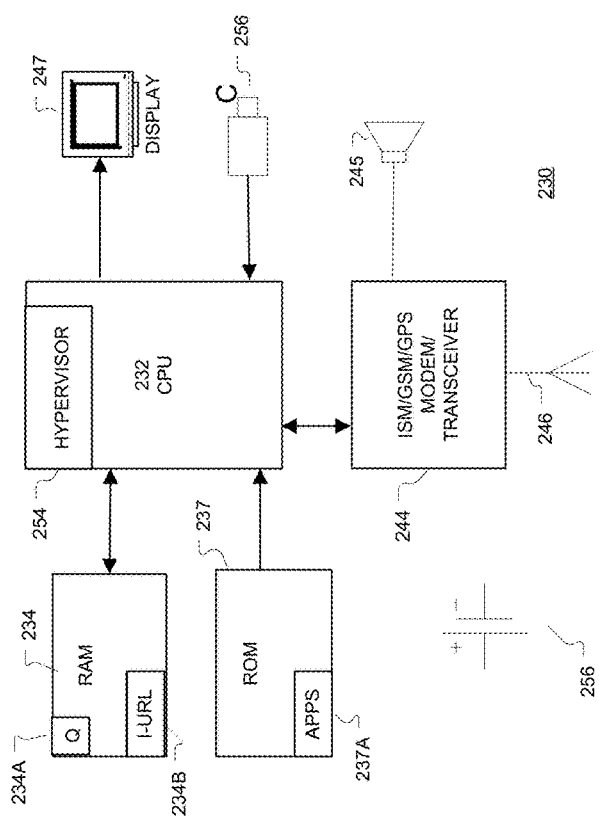
FIG. 6A is a block diagram of an article according to various embodiments.

For example, FIG. 6A illustrates a block diagram of a device 230 that may be employed at least in part in a MD 101A-101E in various embodiments. The device 230 may include a central processing unit (CPU) 232, a random access memory (RAM) 234, a read only memory (ROM) 237, a local wireless/GPS modem/transceiver 244, a display 247, a camera 256, a speaker 245, a rechargeable electrical storage element 256, and an antenna 246. The CPU 232 may include a hypervisor 254. The RAM 234 may include a queue or table 248 where the queue 248 may be used to content. The RAM 234 may also include program, algorithm, and system data and instructions. The rechargeable electrical storage element may be a battery or capacitor in an embodiment.

The modem/transceiver 244 may couple, in a well-known manner, the device 230 to a wired or wireless network 104A, 104B to enable communication with a SMPS 120A-B. The modem/transceiver 244 may also be able to receive global positioning signals (GPS) and the CPU 232 may be able to convert the GPS signals to location data that may be stored in the RAM 234 and provided to a SMPS 120A-40D with a URL/URI request. The ROM 237 may store program instructions to be executed by the CPU 232 or control interface 254.

FIG. 6B illustrates a block diagram of a device 260 that may be employed at least in part in a SMPS 120A-B or CPS 108A in various embodiments. The device 260 may include a central processing unit (CPU) 262, a random access memory (RAM) 264, a read only memory (ROM) 266, a display 268, a user input device 272, a transceiver application specific integrated circuit (ASIC) 274, a microphone 288, a speaker 282, storage 276, electrical energy storage unit 286, and an antenna 284. The CPU 262 may include a server 292. The RAM 264 may include a queue 278 where the queue 278 may store digital media content data.

The ROM 266 is coupled to the CPU 262 and may store the program instructions to be executed by the CPU 262 and the server 292. The ROM 266 may include applications and instructions for the security module 142, the media encoding module 144, the IP communication module 156, the virtual machine (VM) generation module 158, the web server module 162, and the data encryption/decryption module 164. The RAM 264 may be coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include messages, digital media content, VMs, or protocol information. The transceiver ASIC 274 may include an instruction set necessary to communicate content and VMs securely via network 104A, 104B. The ASIC 274 may be coupled to the antenna 284 to communicate VMs and content. When a message is received by the transceiver ASIC 274, its corresponding data may be transferred to the CPU 262 via the serial bus 276. The data can include wireless protocol, overhead information, sensor, and pages to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, and databases 48, 49.

Any of the components previously described can be implemented in a number of ways, including embodiments in software. Any of the components previously described can be implemented in a number of ways, including embodiments in software. Thus, the devices 230, 260 elements including the RAM 234, ROM 237, CPU 232, transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A secure content system for communicating secure content to consumer owned systems via a network, the system having a secure multi-media processing system (SMPS), comprising:
   a secure server comprising hardware memory, the secure server storing a plurality of virtual machines, each virtual machine including unique identity information and logic to enable secure communication within the secure content system and further comprising a central processing unit forwarding via a network the provisioned virtual machine to the consumer owned system for independent execution by a receiving media device (MD); and
   a virtual machine generation module implemented in hardware for provisioning one of the plurality of virtual machines for a consumer owned system.

2. The secure content system of claim 1, wherein the virtual machine generation module provisions one of the plurality of virtual machines for a consumer owned system without human intervention.

3. The secure content system of claim 1, wherein the virtual machine generation module provisions one of the plurality of virtual machines for a consumer owned system with secured credentials.

4. The secure content system of claim 3, wherein the secured credentials are related to the consumer owned system.

5. The secure content system of claim 2, wherein the virtual machine generation module provisions one of the plurality of virtual machines for a consumer owned system upon receipt of a communication from a consumer owned system.

6. The secure content system of claim 5, further comprising a security module, the security module determining the owner of the consumer owned system.

7. The secure content system of claim 6, wherein the secured credentials are related to the consumer owned system and the determined owner.

8. The secure content system of claim 6, wherein the security module determines whether the owner has a second consumer owned system provisioned by the secure content system.

9. The secure content system of claim 1, wherein at least one of the plurality of virtual machines includes logic to enable secure communication with a commonly owned consumer owned system and the virtual machine generation module provisions the at least one virtual machine for a consumer owned system when the owner has a second consumer owned system provisioned by the secure content system.

10. The secure content system of claim 9, wherein the at least one of the plurality of virtual machines secure communication logic conforms to the Digital Transmission Content Protection protocol.

11. A method of securely communicating content between a secure content system and consumer owned systems via a network, comprising:
   storing a plurality of virtual machines, each virtual machine including unique identity information and logic to enable secure communication with the secure content system;
   provisioning one of the plurality of virtual machines for a consumer owned system; and
   forwarding via a network the provisioned virtual machine to the consumer owned system for independent execution by a receiving media device (MD).

12. The method of securely communicating content between a secure content system and consumer owned systems via a network of claim 11, including provisioning one of the plurality of virtual machines for a consumer owned system without human intervention.

13. The method of securely communicating content between a secure content system and consumer owned systems via a network of claim 11, including provisioning one of the plurality of virtual machines for a consumer owned system with secured credentials.

14. The method of securely communicating content between a secure content system and consumer owned systems via a network of claim 13, wherein the secured credentials are related to the consumer owned system.

15. The method of securely communicating content between a secure content system and consumer owned systems via a network of claim 12, including provisioning one of the plurality of virtual machines for a consumer owned system upon receipt of a communication from a consumer owned system.

16. The method of securely communicating content between a secure content system and consumer owned systems via a network of claim 15, further comprising determining the owner of the consumer owned system.

17. The method of securely communicating content between a secure content system and consumer owned systems via a network of claim 16, wherein the secured credentials are related to the consumer owned system and the determined owner.

18. The method of securely communicating content between a secure content system and consumer owned systems via a network of claim 16, further comprising determining whether the owner has a second consumer owned system provisioned by the secure content system.

19. The method of securely communicating content between a secure content system and consumer owned systems via a network of claim 11, wherein at least one of the plurality of virtual machines includes logic to enable secure communication with a commonly owned consumer owned system and including provisioning the at least one virtual machine for a consumer owned system when the owner has a second consumer owned system provisioned by the secure content system.

20. The method of securely communicating content between a secure content system and consumer owned systems via a network of claim 19, wherein the least one of the plurality of virtual machines secure communication logic conforms to the Digital Transmission Content Protection protocol.

* * * * *